United States Patent Office 2,964,447
Patented Dec. 13, 1960

2,964,447

POLYMER-METAL PROCESS

William A. Hosmer, Lee, Mass., assignor to General Aniline & Film Corporation, New York, N.Y., a corporation of Delaware No Drawing. Filed Apr. 10, 1956, Ser. No. 577,193

3 Claims. (Cl. 167—33)

The invention presented in this application is a new and useful compound of a polyvinylpyrrolidone or a vinylpyrrolidone copolymer, with iodine and a metal, such as mercury, in which the toxic properties of the metal are substantially reduced or completely eliminated, without, at the same time, destroying the bactericidal properties.

It has been found possible to produce a compound of polyvinylpyrrolidone with iodine by the simple procedure of mixing appropriate proportions of the dry polymer and dry iodine in a ball mill or the like to effect an initial combination, which combination is completed by a short period of heating to moderate temperatures. This compound of iodine and polyvinylpyrrolidone has many important uses since it contains iodine which has been detoxified but in which the bactericidal properties and chemical reactivity have been retained almost unchanged.

According to the present invention, it is now found that this polyvinylpyrrolidone-iodine compound will absorb, and combine with, considerable quantities of various of the heavy metals. Mercury in particular is readily reactive with the polyvinylpyrrolidone-iodine compound to form a new organo-metallic compound having outstandingly enhanced bactericidal properties while at the same time the toxicity of the new compound remains very low. In addition the compound has many other uses, particularly in a protective paint, as a seed aid and the like.

Basically, the method of preparation consists primarily in mixing the metal in finally divided form with the polyvinylpyrrolidone-iodine compound, with such additional steps as are required by the character of the metal added, a brief heating step being usually required.

It has been found that the combination of iodine and a polymer, or copolymer, of 1-vinyl-2-pyrrolidone or the like results in a compound which contains the iodine both in an available, or titratable state, and as iodide ion. This compound containing the iodine may then be combined with a metal such as mercury, antimony, bismuth or the like to form a complex which is found to be water soluble. The exact character of the chemical combination is still unknown although the metal appears to be chemically bound in the molecule of the polymer. It may be noted also that there is a limit to the amount of metal which may be added and still retain the property of solubility in water. If an excess of mercury is present, it tends to precipitate in the form of an iodide of mercury which may be either the mercuric or mercurous iodide.

Polymers of vinylpyrrolidone useful in this invention include copolymers of vinylpyrrolidone with vinyl acetate, vinyl propionate, other vinyl esters, isopropenyl acetate and other isopropenyl esters, allyl formate, and other allyl esters, including diallyl phthalate and other polyallyl esters, vinyl chloride, vinylidene dichloride, ethylene, 1,3-butadiene, acrolein, acrylic acid and acrylic esters including methacrylates, methacrylamide, styrene, vinyltoluene, isopropenylbenzene, isopropenyltoluene and related compounds, acrylonitrile, 9-vinyl-carbazole, methyl 2-chloroacrylate, and in general, polymerizable unsaturated comonomers of the vinyl type.

By the process of the present invention there is thus produced a new and useful organo-metallic compound containing polyvinylpyrrolidone, iodine and a heavy metal; which compound has a great many valuable uses, particularly as a disinfectant and antiseptic of high potency and low toxicity. Other objects and details of the invention will be apparent from the following description:

In the preparation of the compound of the present invention the first step is the formation of the iodine complex of polyvinylpyrrolidone. This compound is readily prepared by a thorough mixing of dry polyvinylpyrrolidone and dry elemental iodine until a homogenous powder is obtained, preferably by grinding the polymer and iodine together with a mortar and pestle or in a ball mill or other convenient grinding means. When a thorough mixture is obtained the material may desirably be heated for a substantial number of hours, such as 22 to 64 hours at a temperature in the neighborhood of 90 to 100° C. The method of procedure is particularly well shown in U.S. Patent Number 2,706,701 to Beller and Hosmer, issued April 19, 1955. This patent shows the use of iodine only in combination with the vinylpyrrolidone containing polymer, but the reaction goes equally well with chloro-iodo compounds with the same polymers; and with the bromo-iodo compounds with the same polymers.

When the iodine-polymer compound is formed, the next step consists in mixing a substantial amount of the desired metal with the iodine-polymer material. The material may then be ground with a mortar and pestle as before or in a ball mill or other equipment which will produce a thorough mixing effect with a small amount of grinding action. When a thorough dispersion of the metal has been obtained in the polymer-iodine material, the mixture is desirably heated in a closed container until it becomes substantially lighter in color. When this stage is reached, the material is found to be completely soluble in water.

It may be noted that it is not essential that the heavy metal be in the metallic form, since a similar reaction, or perhaps the identical reaction occurs with a heavy metal oxide; the iodine-polymer compound being ground and mixed as before, with a heavy metal oxide.

The most satisfactory metal is mercury, probably in part because of its liquid condition at atmospheric temperatures. However similar reactions proceed with the vinylpyrrolidone-halogen compounds and such metals as antimony, bismuth and the other reactive heavy metals. Although the combination with the metal proceeds much less easily with the solid metals, the reaction goes much better if the solid metals are in colloidal form, and treatment of the metal in a colloidal state, followed by mixing into the polymer and a further treatment at slightly elevated tempreature in the colloidal state will incorporate most of the heavy metals into the polymer. With mercury there appears to be a combination which is in part a full organometallic compound between polymer and metal, and in part a compound somewhat on the order of absorption although this absorption appears to be different in character from that of the usual absorption onto solid surfaces; and the amount of combination, absorption, and simple mixture varies widely according to the characteristics of the metal, including its physical properties and its chemical activity.

EXAMPLE I

To 81 parts of 1-vinyl-2-pyrrolidone having a K value of 30 there was added 19 parts (all by weight) of elemental iodine. This mixture was then rolled for twenty hours in a vitreous container having therein a small number of pebbles. At the end of this time interval the mixture was heated to a temperature just below 100° C. for several hours to complete the reaction. The resulting material was found to contain 16% of available iodine. To this material there were then added four parts by weight of metallic mercury. The mixture was then returned to the vitreous container and rolled for 36 hours longer to obtain a uniformly dispersed mercury phase. When this condition was reached, the mixture was heated to approximately 100° C. for about four hours. The resulting material was found to be completely water soluble.

An analysis of this material showed that it contained:

| | |
|---|---|
| C | 48.46 |
| Hg | 6.37 |
| N | 9.47 |
| I | 17.59 |
| Available iodine | 6.79 |
| Iodide ion | 6.13 |
| Residue (mercury) | 9.06 |

It may be noted that there is a stoichometric relationship between the amount of mercury which can be absorbed and the amount of iodine in the compound. And it appears that from one to two mole equivalents of mercury can be absorbed, based upon the amount of available iodine. An excess of such an amount tends to precipitate the iodine salt of mercury when the material is dissolved in water.

This compound is useful as a biocide as it has a phenol coefficient in excess of 500 when measured in nutrient broth. In fluid thioglycollate, a severe test, the phenol coefficient was found to be about 22. The polyvinylpyrrolidone may act as a detoxifying agent for the mercury so that the high bactericidal activity may be used in the treatment of animals.

EXAMPLE II

*Anti-fouling paint*

| | |
|---|---|
| Alcohol | gallons__ 80 |
| Copolymer [1] | pounds__ 200 |
| Pine oil | gallons__ 6¾ |
| Zinc dust (dry) | pounds__ 55 |
| Zinc oxide (dry) | do____ 100 |
| PVP/Hg complex | do____ 7 |

[1] Copolymer containing 65% vinyl acetate and 35% 1-vinyl-2-pyrrolidinone. Copolymer of sufficient molecular weight to give a Fikentscher K-value of 28 in 2-butanone.

Into a large vessel pour the alcohol and pine oil. Add with stirring the PVP/Hg complex. Then add while stirring the copolymer. Then add the zinc dust and zinc oxide.

EXAMPLE III

*Seed disinfectant*

| | |
|---|---|
| PVP/Hg complex | ounces__ 5 |
| Lanolin | do____ 5 |
| Talc | do____ 90 |

Place talc in a counter rotating, sigma type blade mixer and add PVP/Hg complex with mixer operating. After the PVP/Hg complex is uniformally dispersed add the lanolin and continue mixing until the lanolin is dispersed.

Use by tumbling seed with this powder and 1 qt. of molasses with each 100 lbs. of seeds and disinfectant.

EXAMPLE IV

Another important and in some instances very valuable use for this reaction is found in purification of environment from traces of mercury. Mercury, spilled on a floor is extremely difficult to recover and it remains in traces for very long periods of time, introducing a very substantial poison hazard. This hazard can be completely removed by the placing of the polymer-iodine compound in floor cracks, corners and the like where spilled mercury tensd to collect. There is a reasonably prompt absorption of the merury, particularly the mercury vapors into the polymer and when the absorption is complete, the polymer with its contained mercury is readily swept up and cleared out from cracks, corners and the like by vacuum suction. Similarly an air filter made up of particles of polymer-iodine compound of filter material serves excellently to remove mercury vapors from air and is a highly satisfactory air purifier.

Thus the process of the invention provides a new chemical procedure, and the product is a new compound having many valuable and important uses, not the least of which is that of an efficient disinfectant, of very low toxicity.

While there are above disclosed but a limited number of embodiments of the invention, it is possible to provide still other embodiments with the departing from the inventive concept herein disclosed, and it is therefore desired that only such limitations be imposed upon the appended claims as are stated therein or required by the prior art.

The invention claimed is:

1. The method of preparing a water-soluble detoxicated compound which comprises mixing together a polyvinylpyrrolidone-iodine complex, formed by intimately mixing together polyvinylpyrrolidone and elemental iodine and then heating the resulting mixture to about 100° C., with from 1 to 2 molar equivalents, based on the amount of available iodine, of a heavy metal selected from the group consisting of mercury, antimony and bismuth, and then heating this resulting mixture to a temperature of about 100° C. whereby there is formed a water-soluble product containing polyvinylpyrrolidone, iodine and said heavy metal.

2. The method of preparing a water-soluble detoxicated compound which comprises mixing together a polyvinylpyrrolidone-iodine complex, formed by intimately mixing together polyvinylpyrrolidone and elemental iodine and then heating the resulting mixture to about 100° C., with from 1 to 2 molar equivalents, based on the amount of available iodine, of mercury, and then heating this resulting mixture to a temperature of about 100° C. whereby there is formed a water-soluble product containing polyvinylpyrrolidone, iodine and mercury.

3. The method of preparing a detoxicated composition containing mercury which comprises mixing together a polyvinylpyrrolidone-iodine complex, formed by mixing together 81 parts by weight of polyvinylpyrrolidone with 19 parts by weight of elemental iodine, ball-milling the mixture for 20 hours and then heating the same at a temperature of about 100° C. for several hours, with 4 parts by weight of mercury and then ball-milling this resulting mixture for 36 hours after which the mixture is heated to about 100° C. for 4 hours whereby there is formed a completely water-soluble product containing polyvinylpyrrolidone, iodine and mercury.

References Cited in the file of this patent

UNITED STATES PATENTS

| | | |
|---|---|---|
| 2,495,918 | Keiser | Jan. 31, 1950 |
| 2,706,701 | Beller et al. | Apr. 19, 1955 |
| 2,739,922 | Shelanski | May 27, 1956 |
| 2,754,245 | Hosmer | July 10, 1956 |

OTHER REFERENCES

Davis et al.: Potassium-Mercuric-Iodid Germicidal Tablets, Pub. No. 126, pp. 1–8 (1919).

Jour. of the Soc. of Cos. Chemists 5: 2, pp. 129–132, June 1954.

Drug and cos. Ind. 75: 1, pp. 32, 33, 126–130 (reprint), July 1954.